United States Patent [19]

Beauvais et al.

[11] 4,400,401

[45] Aug. 23, 1983

[54] METHOD OF MICROWAVE STERILIZING CANNED FOOD

[76] Inventors: Max P. Beauvais, 46 Southridge West, Tiburon, Calif. 94920; Raymond E. Camezon, 623 Tunbridge Rd., Danville, Calif. 94526

[21] Appl. No.: 305,281

[22] Filed: Sep. 24, 1981

Related U.S. Application Data

[62] Division of Ser. No. 122,354, Feb. 19, 1980, abandoned.

[51] Int. Cl.³ ............................................. A23L 3/10
[52] U.S. Cl. ...................................... 426/234; 99/369;
219/10.55 M; 422/21; 422/25; 422/113;
426/402; 426/403
[58] Field of Search ............... 426/107, 234, 113, 118,
426/131, 241, 243, 402, 403, 401, 407, 399;
219/10.55 R, 10.55 E, 10.55 M; 99/369, 359,
451; 422/21, 25, 113, 26

[56] References Cited

U.S. PATENT DOCUMENTS

| | | | |
|---|---|---|---|
| 529,619 | 11/1894 | Hussener | 99/369 |
| 609,856 | 8/1898 | Weck | 99/369 |
| 676,869 | 6/1901 | Bourdeau | 426/407 |
| 682,865 | 9/1901 | Wright | 99/369 |
| 947,062 | 1/1910 | Hawkins | 126/369 |
| 1,197,646 | 9/1916 | Meierjohann | 99/369 |
| 1,524,623 | 1/1925 | Landrum et al. | 426/511 |
| 1,621,132 | 3/1927 | Reinbold | 99/472 |
| 2,457,867 | 1/1949 | Chambers | 99/472 |
| 2,555,230 | 5/1951 | Ford | 426/403 |
| 2,622,187 | 12/1952 | Welch | 426/234 |
| 3,494,722 | 2/1970 | Gray | 426/234 |
| 3,561,982 | 2/1971 | Oeth | 426/407 |
| 3,672,907 | 6/1972 | Hudson | 426/241 |
| 3,676,058 | 7/1972 | Gray | 426/234 |
| 3,753,651 | 8/1973 | Boucher | 422/21 |
| 3,840,686 | 10/1974 | Hurwitz | 426/510 |
| 3,854,023 | 12/1974 | Levinson | 426/407 |
| 3,875,318 | 4/1975 | Davies | 426/521 |
| 3,949,934 | 4/1976 | Gogio | 426/234 |
| 3,973,480 | 8/1976 | Andersen | 99/359 |
| 4,051,972 | 10/1977 | Botkin | 426/407 |
| 4,051,973 | 10/1977 | Botkin | 426/131 |
| 4,103,431 | 8/1978 | Levinson | 426/234 |
| 4,104,957 | 8/1978 | Freedman et al. | 219/10.55 E |
| 4,121,510 | 10/1978 | Frederick | 426/243 |
| 4,132,811 | 1/1979 | Standing et al. | 426/234 |
| 4,156,741 | 5/1979 | Beauvais et al. | 426/131 |
| 4,280,032 | 7/1981 | Levinson | 219/10.55 E |
| 4,294,167 | 10/1981 | Beauvais et al. | 99/369 |
| 4,329,919 | 5/1982 | Andersen | 426/407 |

FOREIGN PATENT DOCUMENTS 1812470 6/1970 Fed. Rep. of Germany ...... 426/234

OTHER PUBLICATIONS

Modern Plastics Encyclopedia, vol. 48 #10A 10/71.
Retailing Home Furnishings, 1/16/78, p. 64.

*Primary Examiner*—Steven L. Weinstein
*Attorney, Agent, or Firm*—Limbach, Limbach & Sutton

[57] ABSTRACT

A method for canning food products in a non-metallic jar, utilizing a non-metallic jar lid and a none metallic enclosure enveloping the jar and lid and which is placed within a microwave oven for heating with a pressure control check valve for limiting the maximum pressure within the enclosure during heating and preventing entry of air during subsequent cooling of the enclosure and food product.

3 Claims, 2 Drawing Figures

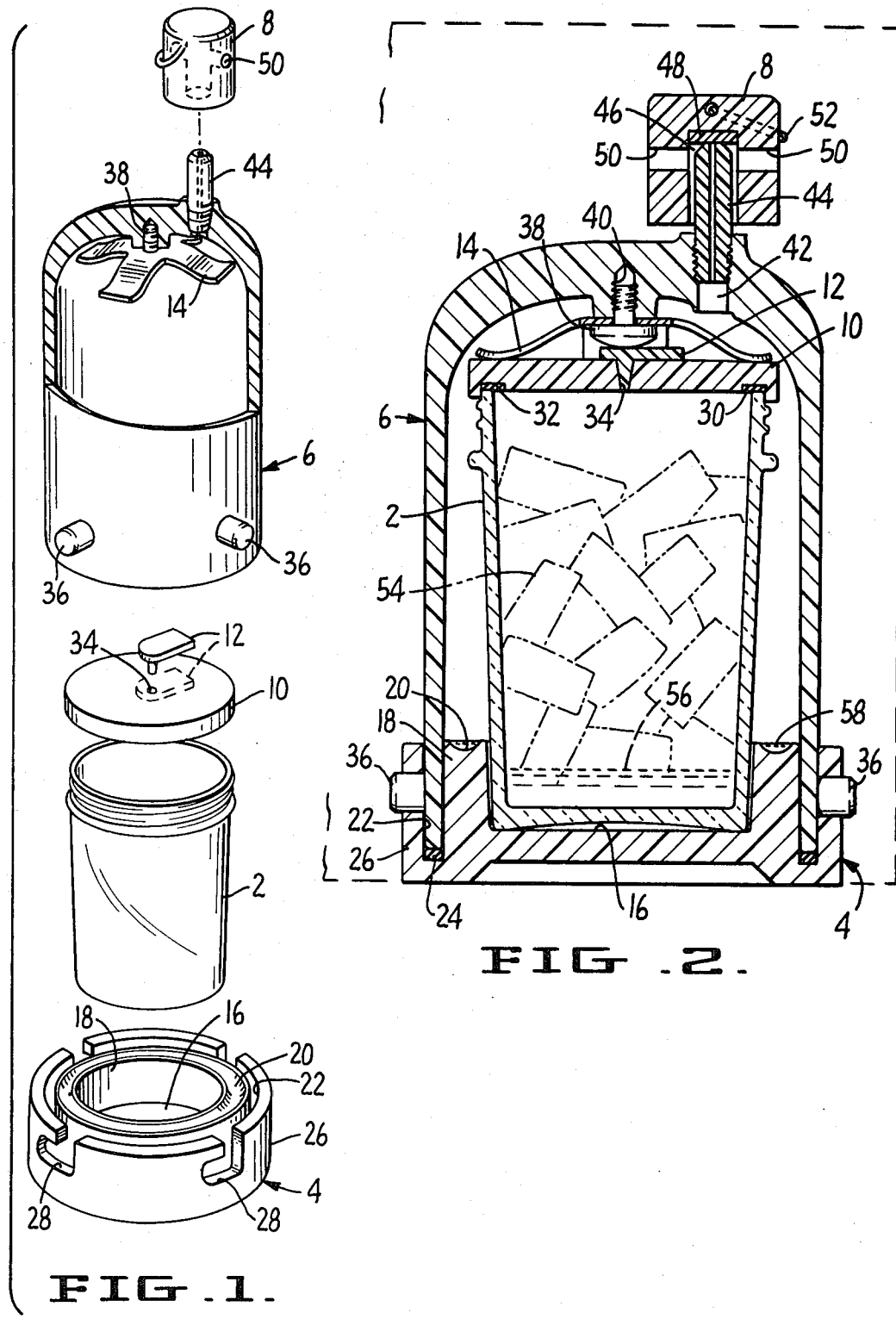

METHOD OF MICROWAVE STERILIZING CANNED FOOD

This is a divisional of application Ser. No. 122,354, filed Feb. 19, 1980, now abandoned.

BACKGROUND OF THE INVENTION

This invention relates to methods and apparatus for canning food products. More particularly, it relates to methods and apparatus which are suitable for use in home canning operations. Even more particularly, the invention relates to such methods and apparatus which are suitable for use with a home microwave oven.

Home canning of various types of produce, such as fruits and vegetables, has become a popular activity in the United States. While there are many attractive reasons for such home canning, a major disadvantage to the procedure has always been the necessity for pressure cooking the food product within the container. This process has generally involved preparing the food products and placing them in containers, such as glass jars with loosely closed tops, and then placing the container and product within a pressure cooking vessel, or retort; and then applying steam to the containers and their contents for an extended period of time within the pressure cooker, to cook and sterilize the food.

The conventional apparatus and methods for home canning have suffered from a number of disadvantages which have discouraged many people from engaging in the home canning process. The disadvantages have included the necessity for expensive and bulky pressure cooking apparatus and the requirement of substantial time and heating energy to perform the pressure cooking procedure. These requirements have made home canning economically practical only when conducted on a substantial scale. Furthermore, pressure cooking of certain fruits and vegetables in the canning process destroys many desirable characteristics of the food, including crisp textures and retention of vitamins within the fruits and vegetables themselves.

A far simpler approach to this home canning process is disclosed in the co-pending patent application Ser. No. 107,425 filed Dec. 26, 1979 in the names of Max P. Beauvais and Raymond E. Camezon, now U.S. Pat. No. 4,294,167, the inventors of this application. Such application discloses a simpler apparatus for use in stove top canning operations.

In recent years the home microwave oven has enjoyed an enormous growth in popularity, largely because of the speed with which it cooks, generally taking about one fourth the time of conventional oven cooking. Although the microwave oven has provided for rapid cooking, it has not been suitable for use in conventional home canning operations for several reasons. One reason is the enormous absorption of microwave energy by any metallic objects placed within the oven cavity, such that those metallic objects would absorb a great proportion of the microwave energy, thus reducing that available for sterilizing and preparing the food. For this reason, it is generally considered highly inadvisable to place any metallic objects within a microwave oven when it is operating. Conventional home canning apparatus is almost entirely of metallic construction, even including the lids used to seal glass jars. Accordingly, none of this apparatus is suitable for use in microwave ovens. Further, even if the conventional apparatus were fabricated of a material suitable for use in a microwave oven, the relatively small (generally one cubic foot) volume of most microwave ovens precludes the use of the bulky conventional apparatus. Accordingly, until now there has been no satisfactory apparatus for convenient home canning, which can take advantage of the rapid heating of a microwave oven.

SUMMARY OF THE INVENTION

To overcome the foregoing and other disadvantages of prior art canning methods and apparatus, it is an object of the present invention to provide such methods and apparatus which are fast and simple to use.

It is another object of the invention to provide such method and apparatus which are suitable for use in microwave ovens.

It is a further object of the invention to provide such methods and apparatus in which the food product may be sterilized within the microwave oven quickly and without the texture-destroying and vitamin-destroying prolonged pressure cooking and which may provide for storage with a high vacuum within the canning container to avoid spoilage caused by the presence of oxygen.

To achieve these and other objects, which will become apparent below, canning apparatus is provided for canning food products in non-metallic jars, which apparatus comprises a jar lid of non-metallic material and having a seal for engaging the mouth of the jar and forming an air-tight seal therewith under the influence of greater atmospheric pressure outside the jar than inside, and an enclosure of non-metallic material substantially transparent to microwave energy for enveloping the jar and lid. This enclosure includes a base member for engaging the base of the jar and holding it in a predetermined position, a cover member releasably engaging the base member and enclosing at least the portions of the jar and lid not enclosed by the base member, a resilient structure for urging the jar lid against the jar mouth, and a pressure control check valve communicating with the interior of the enclosure for limiting the maximum pressure within the enclosure to a predetermined amount above the ambient pressure outside while preventing any inflow of air from the outside.

A method of sterilizing and canning food products within non-metallic jars and without substantial cooking thereof is provided and includes the steps of placing the food products into such a jar with a small quantity of liquid sufficient to cover the bottom of the interior of the jar, placing a non-metallic lid having structure capable of air-tight sealing over the mouth of the jar, enclosing the jar and lid within an enveloping air-tight non-metallic enclosure having a one way check valve for permitting expulsion of air and steam from the enclosure, and the enclosure having structure resiliently urging the lid against the mouth of the jar, applying sufficient microwave energy to the enclosure jar and food products to convert at least a substantial portion of the liquid into steam to sterilize the food products and fill the jar and interior of the enclosure with steam of a predetermined pressure for a predetermined period of time, removing the microwave energy and applying a cooling fluid to at least the lower portions of the exterior of the enclosure while preventing entry of fluids into the enclosure interior, to cool the enclosure and its interior, and then venting the enclosure interior to ambient pressure.

BRIEF DESCRIPTION OF THE DRAWINGS

One preferred embodiment of the apparatus of this invention will be described in detail in which:

FIG. 1 is an exploded perspective view thereof, partially in section, and

FIG. 2 is a side sectional view of the assembled apparatus of FIG. 1, such section being taken through the center of the apparatus.

DETAILED DESCRIPTION OF A PREFERRED EMBODIMENT

The basic apparatus of the present invention is illustrated in FIGS. 1 and 2 and includes generally, a jar 2, which may suitably be a conventional canning jar of pint, quart, or other desired capacity, enclosure base 4 and enclosure cover 6 and pressure regulating weight 8. Also provided are jar lid 10, jar lid vent closure 12 and jar lid biasing spring 14.

While the jar 2 is conventionally made of glass, the base member 4, cover 6, pressure regulating weight 8, jar lid 10 and biasing spring 14 may be formed of any of a number of suitable non-metallic materials. Preferably, such materials should be generally transparent to microwave energy, in order that most of the energy may be directed to the food products themselves. One suitable non-metallic material is a polysulfone synthetic resin, although other known materials having the desired characteristics may readily be substituted. The vent closure 12 may suitably be fabricated of an appropriate silicone rubber, or the like.

The base member 4 preferably is of a circular configuration, as shown in FIG. 1, with a recess 16 in its center. This recess 16 is preferably configured and dimensioned to receive and position a canning jar, such as a Mason jar of pint or quart size. In the upper surface of the ring 18 surrounding recess 16 there preferably is provided a shallow groove 20, for purposes to be described below.

Outside the ring 18 is a deep groove 22 having an O-ring sealing member 24, suitably of a silicone rubber or similar material at its base. Outside groove 22 is outer ring 26, having a plurality of L-shaped cutouts 28, to form the sockets for a bayonet mount to be described below.

The jar lid 10, suitably formed of any suitable, rigid non-metallic material, such as a synthetic resin, includes a groove 30 in its underside, within which is provided a resilient gasket 32, of a material suitable for forming an air-tight seal between the lid 10 and the mouth of the jar 2. Extending through the lid 10 is a vent hole 34, which suitably may be conically tapered as shown in FIG. 2. The removable closure 12 includes a portion insertable into the vent hole 34 for blocking the vent hole to prevent entry of air through that hole except when the closure 12 is removed.

Cover member 6 may suitably be of the generally bell-shaped configuration shown in FIGS. 1 and 2. Spaced circumferentially around the cover adjacent its open lower end are a plurality of bosses 36, positioned to cooperate with the L-shaped slots 28 to form a "bayonet" mount to assemble and lock the cover 6 and base 4 together. In the assembled configuration, shown in FIG. 2, the lower portion of the cover 6 is received into the base groove 22 and bears firmly against the sealing member, or O-ring, 24 to form an air-tight seal between the cover 6 and base member 4.

Preferably, the interior of the cover 6 is configured and dimensioned to fit relatively closely around a jar and lid positioned within the recess 16 in the base member 4, as shown in FIG. 2. Connected to the upper portion of the interior of the cover 6 is resilient leaf spring 14, also made of a suitable non-metallic material. The leaf spring 14 may suitably be attached to the cover 6 by a resilient plug 38, which may be threaded or force fitted into a recess 40 in the cover 6. As shown in FIG. 2, the cover 6 is dimensioned such that, when assembled with the base 4 to form the enveloping enclosure, the spring 14 resiliently urges the jar lid 10 against the mouth of the jar 2. In this assembled configuration the plug 38 resiliently presses against the closure 12, also serving to urge the lid 10 against the jar mouth.

An aperture 42 is provided through the cover 6, suitably with a tube 44, of synthetic resin, inserted thereinto, as by threading. This tube 44 provides for venting the interior of the enclosure when desired.

Weighted pressure regulating member 8 includes a recess 46 for receiving tube 44 thereinto, and has a sealing gasket 48 at the base of the recess 46, for resiliently sealing against the open outer end of the tube 44 under the weight of the member 8. A pair of ports 50 communicate with the recess 46 to provide for venting pressurized fluids escaping through the interior of the tube 44. If desired, a bail 52 may be provided for lifting the weighted member 8.

The apparatus of this invention having been described above, a preferred method of its use may be seen. Into the non-metallic container 2, suitably a glass canning jar, may be placed the food products 54 to be canned, for example, fresh fruits or vegetables (FIG. 2). Either before, concurrently with, or after placing the food product 54 into the jar 2, a small amount of liquid 56 is placed into the jar, the amount needing to be sufficient only to cover the bottom of the jar. This liquid 56 may suitably be an aqueous solution or juices from the food product. The lid 10 is then placed loosely over the mouth of the jar and the jar and lid combination placed into the recess 16 of the base 4. A small amount, suitably a fraction of an ounce, of water 58 is placed in the groove 20 in the base 4. At this point the cover member 6, with its pressure regulating weight 8, is then assembled with the base 4, inserting the lower portion of the cover into the base groove 22 and the bosses 36 into the L-shaped slots 28, while providing pressure, and then turning the cover sufficiently to lock the base and cover together. This engagement, with the base of the groove 22 and the lower edge of the housing 6 compressively engaging the sealing member 24, forms an enveloping, air-tight enclosure. The tube 44 with the pressure regulating weight 8 also forms a one-way check valve for permitting expulsion of air and steam from the enclosure while preventing any back flow of air into the enclosure.

As shown in FIG. 2, the assembly of the cover 6 and base 4 also brings the spring member 14 attached to the cover 6 into resilient engagement with the upper surface of the lid 10, thus urging the lid 10 against the mouth of the jar. Similarly, the attaching plug 38 engages the removable closure 12 on the lid and further resiliently urges the lid against the jar mouth.

The apparatus assembled as described is then placed into a microwave oven and microwave energy is applied thereto. Since the jar and enclosure are formed of materials which are generally transparent to microwave energy, most of that energy directed against the apparatus is passed directly therethrough and is available for heating the food product 54, liquid 56 and water 58. Since the water 58 in the shallow groove 20 is very shallow and is not shielded by the food product from the microwave energy, which is commonly directed from above, this water 58 will quickly vaporize into steam. The expansion of this steam will serve to expel the air between the lidded jar and the interior of the enclosure, driving it out the exhaust tube 44, the pressure of the steam lifting the weighted member 8 sufficiently to allow such expulsion. Continued heating, even for a very few minutes, will quickly convert a portion of the liquid 56 within the jar into steam, causing that steam to pass up through the food product 54 to sterilize the food product, even without substantial cooking thereof. The expansion of this steam within the jar 2 will then force the lid 10 upwardly against the resilient urging of the spring 14 and button 38 to allow the steam to escape between the gasket 32 on the lid and the mouth of the jar into the interior volume of the enclosure surrounding the jar. The expansion and escape of the steam from within the jar also serves to drive substantially all air from within the lidded jar, helping to prevent subsequent spoilage. Steam pressure above the desired predetermined maximum pressure again escapes out tube 44 past the gasket 48 and out the ports 50 of pressure regulating weight 8.

Once the predetermined pressure and temperature are reached, as evidenced by the steam escaping out ports 50 of the pressure regulating weight 8, the sterilizing process may be continued for a predetermined desired time, typically only a very few minutes with the uniform heating of a microwave oven. At the completion of this time the microwave energy is removed and the entire apparatus may be removed from the microwave oven for cooling. This cooling suitably may be performed by applying a cooling fluid to the apparatus, as by placing the entire apparatus into either standing or running water sufficient to cover the lower portion of the enclosure, without the water extending above the opening of the vent tube 44. Since the cooling will thus take place most quickly from the outside inwardly, any steam remaining between the jar and the interior of the enclosure will quickly be condensed, substantially lowering the pressure within the interior of the enclosure. By virtue of the one-way check valve formed by the action of the weight 8 and its gasket 48 over the outlet of vent tube 44, there can be no inflow of air into the enclosure as long as the weight 8 remains in place. Also, since the volume between the jar and the interior surface of the enclosure will be cooled before the interior of the lidded jar, the pressure will be reduced outside the jar more quickly than inside. This pressure reduction will thus tend to draw out the remaining steam from within the jar and effect an evaporative or vacuum cooling of the contents of the jar. This evaporative cooling will continue until the pressure differential between the interior and exterior of the jar is reduced to a level that the engagement between the lid and the jar mouth will permit no further flow, thus indicating substantial cooling of the interior of the jar with its resulting reduced steam pressure. Such sufficient cooling may take only a very few minutes.

After this brief cooling by the application of the cooling fluid to the exterior of the enclosure, the apparatus may be removed from the cooling fluid and the pressure regulating weight 8 lifted off the end of tube 44. The removal of this weight 8 thus effects a sudden venting of the interior of the enclosure to the surrounding atmosphere, providing for further cooling within, and causing the pressure differential effected by the substantially reduced pressure, on the order of a 30 to 40 torr vacuum, within the jar 2 to urge the lid 10 and its gasket 32 firmly against the mouth of the jar into an air-tight seal with the jar mouth. The engagement of the closure 12 within the vent hole 34 prevents air leakage through that vent hole. After venting the interior of the enclosure to ambient pressure, the cover 6 may then be disassembled from the base 4 by giving it a slight turn counterclockwise, when viewed from above, and lifting it to disengage the bosses 36 from the base slots 28. At this point the canning procedure is substantially complete and the lid 10 will remain firmly sealed against the mouth of the jar 2 by virtue of the greater atmospheric pressure outside the jar than inside.

When it is desired to open the jar 2 for removal of the food product from within, it may easily be done in any of several ways. If it is desired to heat the food product, the sealed jar may be heated, by placing it in hot water or otherwise, to increase the pressure within. When the pressure within the container is substantially equalized with the ambient pressure, the lid 10 may simply be lifted off. Due to the high vacuum within the container, this heating and its creation of steam within the container may be done very quickly, often in only one or two minutes. Alternatively, if it is not desired to heat the product, such as where fruit is desired to be served cold, the closure 12 may be pulled free from its engagement within the vent hole 34, thus venting the interior of the jar 2 to atmospheric pressure, and again permitting lifting off of the lid 10. This closure 12 may be reused in a subsequent canning procedure by simply reinserting it into the vent hole 34 of the lid to be used.

While the foregoing describes a particularly preferred embodiment of the method and apparatus of the present invention, it is to be recognized that numerous variations and modifications of this apparatus and method, all within the scope of the invention, will readily occur to those skilled in the art. Accordingly, the scope of the invention is to be limited solely by the claims appended hereto and not by the description of the preferred embodiments

We claim:

1. A method of sterilizing and canning food products within a non-metallic jar, comprising the steps of
    placing the food products into said jar with a small quantity of liquid sufficient to cover the bottom of the interior of said jar;
    placing a non-metallic lid having means capable of air-tight sealing over the mouth of said jar;
    enclosing said jar and lid within an enveloping airtight non-metallic enclosure having a one-way check valve for permitting expulsion of air and steam from the enclosure interior, and having means resiliently urging said lid against the mouth of said jar said means resiliently urging said lid against the mouth of said jar being forceable by the lid away from the jar at a predetermined pressure;
    applying sufficient microwave energy to said enclosure, jar and food products to convert at least a substantial portion of said liquid into steam to sterilize said food products and fill said jar with steam;
    continuing to apply said microwave energy to expand said steam and to expel said steam from said jar between the jar and lid as the steam forces the lid against said resilient urging means and expanding into the interior of said enclosure at said predetermined pressure for a predetermined period of time;

venting some of said steam from said enclosure through said valve;

and then discontinuing said application of microwave energy;

thereafter applying a cooling fluid to at least the lower portions of the exterior of said enclosure while preventing entry of fluids into said enclosure interior to cool said enclosure and its interior faster than said jar and lid, such that any steam surrounding the jar inside the enclosure will condense; thereby reducing the pressure around the jar in relationship to the pressure in the jar causing said lid to raise against said resilient means thus drawing steam out of the lidded jar until the pressure differential between the interior and exterior of the jar is reduced to a level such that said urging means will permit no further flow of said steam;

condensing said steam and cooling the food products within the jar while the lid remains resiliently urged against the jar mouth with the pressure within the enclosure and jar being substantially less than the ambient pressure exterior to the enclosure, and venting said enclosure interior to ambient pressure, whereby the greater pressure outside the jar and reduced pressure inside the jar serves to urge the lid into an air-tight seal with the jar mouth.

2. The method of claim 1 further comprising the step of placing a small quantity of water within said enclosure but outside said jar before closing said enclosure around said jar, whereby, upon application of the microwave energy to the enclosure and jar, that small quantity of water will quickly turn to steam and expel the air from the enclosure interior through the check valve.

3. The method of claim 1 wherein said cooling fluid is applied by placing said enclosure into a container of water.

* * * * *